United States Patent

Duerden

[15] 3,699,527

[45] Oct. 17, 1972

[54] DATA STORE EQUIPMENTS

[72] Inventor: Francis Duerden, Stortford, England

[73] Assignee: The Marconi Company Limited, London, England

[22] Filed: June 28, 1971

[21] Appl. No.: 157,112

[30] Foreign Application Priority Data

July 16, 1970 Great Britain..........34,480/70

[52] U.S. Cl...............................................340/172.5

[51] Int. Cl............................G11b 13/00, G06f 3/06

[58] Field of Search .........340/172.5, 174.1; 178/6.6; 318/18

[56] References Cited

UNITED STATES PATENTS

| | | | |
|---|---|---|---|
| 3,037,194 | 5/1902 | Dirks | 340/172.5 |
| 3,069,666 | 12/1962 | Austin | 340/174.1 |
| 3,293,613 | 12/1960 | Gabor | 340/172.5 |
| 3,294,902 | 12/1966 | Maxey | 178/6.6 |
| 3,302,180 | 1/1967 | Donohoe | 340/172.5 |
| 3,365,634 | 1/1968 | Centner | 318/18 |
| 3,454,930 | 7/1969 | Schoeneman | 340/172.5 |
| 3,484,751 | 12/1969 | Cameron et al. | 340/172.5 |
| 3,491,341 | 1/1970 | Alaimo | 340/172.5 |

*Primary Examiner*— Paul J. Henon
*Assistant Examiner*—Ronald F. Chapuran
*Attorney*—Donald M. Wight et al.

[57] ABSTRACT

Stored data signals, identified by label signals recorded a little in advance of the data signals, are searched for at high tape speed and played off at low tape speed, identification of the label signals automatically producing the tape speed change and setting the equipment to play off the data signals. A terminating signal recorded after the data signals stops the tape and terminates the sequence. Additional apparatus facilitates the recording of data and label signals.

13 Claims, 2 Drawing Figures

INVENTOR
Francis Duerden
BY
Baldwin Wight & Brown
ATTORNEYS

INVENTOR
Francis Duerden
BY
Baldwin Wight & Brown
ATTORNEYS

DATA STORE EQUIPMENTS

This invention relates to data store equipments suitable for use in so-called data terminals.

It is common practice in data terminals to provide a store of items of information in digital form — such for example, as signals representative of invoice forms or other fixed format information material — the storing being usually magnetic storing on magnetic tape. There may be a great many such items of information stored on the same tape. When any particular item of stored information is required to be played off the tape must be run through until that item is found, i.e., until the beginning of that item reaches the play off or pick-up head. Because of the large number of items commonly stored on one tape, the necessary "searching" operation to find a particular item takes in most cases, an undesirably long time if the tape speed, during search, is the same comparatively low tape speed which is used during play off. It is therefore of great practical advantage to effect searching at a considerably higher tape speed than the play off speed. One obvious way of enabling this to be achieved is by numbering the items in terms of their sequential recorded positions along the length of the tape, providing some sort of counter-indicator driven by the tape, running the tape at a high searching speed until the counter-indicator indicates that the sequential position at which a desired recorded item has been reached, and then slowing down the tape to the speed required for playing off the said desired item. An arrangement of this nature has serious practical disadvantages. Important among these disadvantages is that, since it relies for its operation on identifying items by their sequential positions along the length of the tape obvious difficulties present themselves if it is required, as it often is, to erase a particular recorded item and replace it by another, for the counter-indicator indication appropriate to the sequential position on the tape at which the original item was recorded must now identify a new item. Moreover quite apart from the matter of erasing some items and inserting others such an arrangement is not automatic in operation, the operator having to ascertain (from an index or list) the number (or other indication) of the item he wants, run the tape at high speed until that number (or other indication) appears, and then manually operate a control switch or button to slow down the tape and effect play off of the desired item. In addition, because of this, substantial gaps must in practice be left in the tape between consecutive recorded items and therefore economic use of available tape length is not achieved.

The facility of recording items or erasing old ones and substituting new ones is almost always also required in a data store equipment and considerations which are like those above mentioned in connection with playing off arise in connection with recording. Here there is the requirement of providing a high tape speed for searching for a place on the tape to effect recording of a new or substituted recording and a low tape speed for effecting the actual recording and here too the satisfaction of this requirement by identifying items by their sequential positions on the tape involves serious disadvantages.

The present invention seeks to provide improved data store equipment which will play off pre-recorded items of information (and which may not also include the facility of recording items of information) which shall be such that any desired item may be found at high speed and played off at low play-off speed, fully automatically and quite independently of the sequential position of the desired item on the tape.

According to this invention a data store equipment adapted to search at relatively high speed for any of a plurality of items of information recorded on a record body and to play off the same at relatively low speed when found comprises recorded signal pick-up means for picking up signals recorded on said body; motor means for driving said record body relatively to said pick-up means; control means for controlling said motor means and having high speed, low speed and stop settings; means (for operation when it is desired to search for a particular item ) for initially setting said control means to its high speed setting; means responsive to any of a plurality of selectable label signal sequences each of which is individual to and identifies a different item and each of which has been recorded on said body in a position a little in advance of the beginning of the item it identifies, for automatically changing over said control means to its slow speed setting; and means responsive to a pre-determined terminating signal sequence which has been recorded on said body in positions each of which is a little behind the end of a different item, for changing over said control means to its stop position.

Preferably the record body is a magnetically recorded tape and the pick-up means are magnetic recorded signal pick-up means. However other suitable forms of record body as known per se may be used - for example a photographic film record on which information, digital or otherwise, has been recorded photographically — the signal pick-up means being, of course, of a type suited to the nature of the record body employed.

The label signal sequences, signals representative of items of information and the terminating signal sequences may be recorded on the same track with which is associated a single pick-up head. Alternatively, however, there may be two tracks side by side on the same record body, one recorded with signals representative of items of information and the other recorded with the label signal sequences and the terminating signal sequences, there being two pick-up heads, one associated with each track.

It is possible to use an ended record body and to provide means for reversing the direction of run of the motor means when either of the two ends is approached. Preferably, however, the record body is a continuous loop without ends and the motor means is arranged to run always in the same direction.

Preferably the recorded signals, whether item information signals or label or terminating signal sequences, are digital signals.

A preferred form of data store equipment includes, for searching for and playing off desired recording items, a first one-character register to which clock timing pulses are applied through a normally open gate; means for entering in said register input signals corresponding to a pre-determined initial character; an initial gate connected to the output of said register and pre-wired to recognize the initial character; a final gate also connected to the output of said register and prewired to recognize a different final character; a first mutliple character register; means actuated upon response of said first one-character register when recognizing said initial character for clearing any signals stored in said multiple character register and preparing the same to receive further signals; a tape register which is also a multiple character register of the same number of characters as the first; means also actuated upon response of said first one-character register when recognizing said initial character for clearing any signals in the tape register and preparing the same to receive further signals; means for entering into the prepared first multiple character register signals corresponding to a desired multi-character label; means actuated by said multiple character register when filled for causing the aforesaid normally open gate to close temporarily inhibiting the supply of further input signals setting the motor control means to its high searching speed position and setting a switch device into a position in which it connects the output of a recorded label pick-up head to the input of said tape register; means responsive to another pre-determined signal for setting the motor running at the high searching speed to which the motor control unit has been set; means for applying to said tape register pulses derived from digit pulses recorded on the record body and occurring at a frequency proportional to the speed thereof; means actuated automatically when the label already stored in said first multiple character is matched by a label fed to said tape register from said pick-up head for re-opening the aforesaid normally closed gate and removing the aforesaid temporary inhibition to permit the aforesaid final character to enter the first one-character register; means actuated upon recognition of said final character by said final gate for causing the motor to run at the low speed already set up by the motor control and changing over said switch device to a position in which it connects the output of a data pick-up head to a message register to which clock pulses at a lower frequency corresponding with the low motor speed are supplied; and means actuated by the appearance in the output from the data pick-up head of a pre-determined recorded terminating signal sequence for stopping the motor and restoring the equipment to its original condition.

Preferred additional apparatus for providing the facility of recording comprises recording means; means entering a further pre-determined character into the previously mentioned first one-character register; a record gate also connected to the output of said first one-character register and adapted to recognize said further character; means actuated upon recognition of said further character by the record gate for starting the motor running; means dependent upon motor speed for disabling said first one-character register and temporarily preventing the supply of input signals until the motor reaches its high search speed; means, enabled when said search speed is reached, for utilizing the recording means to record a multi-character label; means actuated by the above-mentioned final gate upon recognition thereby of the final character to change over the motor control to cause the motor to run at the low speed required for recording or playing off; means for supplying data signals to the recording means for recording the same while the motor is running at low speed; and means responsive to the above-mentioned pre-determined terminating signal sequence for stopping the motor.

Preferably means are provided for effecting inhibiting the supply of signals to the equipment whenever the motor speed differs materially from that pre-determined speed which corresponds with the setting of the motor control at the time. Such means may conveniently include a tachometer switch.

Where, as is preferred, an endless record is employed, there is preferably provided a timer, which, when started, runs for substantially the time taken by the motor, running at high or search speed, to cause traversal of the whole record length; means, actuated whenever the motor is started from rest, for starting the timer; and means actuated by the timer at the end of its time, for stopping the motor and setting the equipment into its rest condition if this has now already been done.

Preferably also means, operable upon the picking up of an already recorded label when the equipment is being used for recording, are provided for disabling the equipment as regards recording and/or giving an alarm indication whereby accidental over-running of an already recorded item by a new item being recorded is prevented.

Preferably again means are provided for effectively deleting any recorded item which is no longer required on the record by searching for said label at search speed and deleting said label. As will be apparent deletion of a label in effect deletes the item to which that label is appropriated.

In usual practice of the invention the various characters and signal sequences, including data characters herein before mentioned are provided by a keyboard and register store combination as known per se, the keyboard being used to put the required characters and sequences, in the required order, into the store from which they are taken as a sequence of input signals to the remainder of the apparatus. However, as will now be apparent, the equipment lends itself to operation by other sources of the required characters and sequences, e.g., remote sources or sources constituted by computer outputs.

The invention is illustrated in the accompanying drawings in which.

Figure 1:
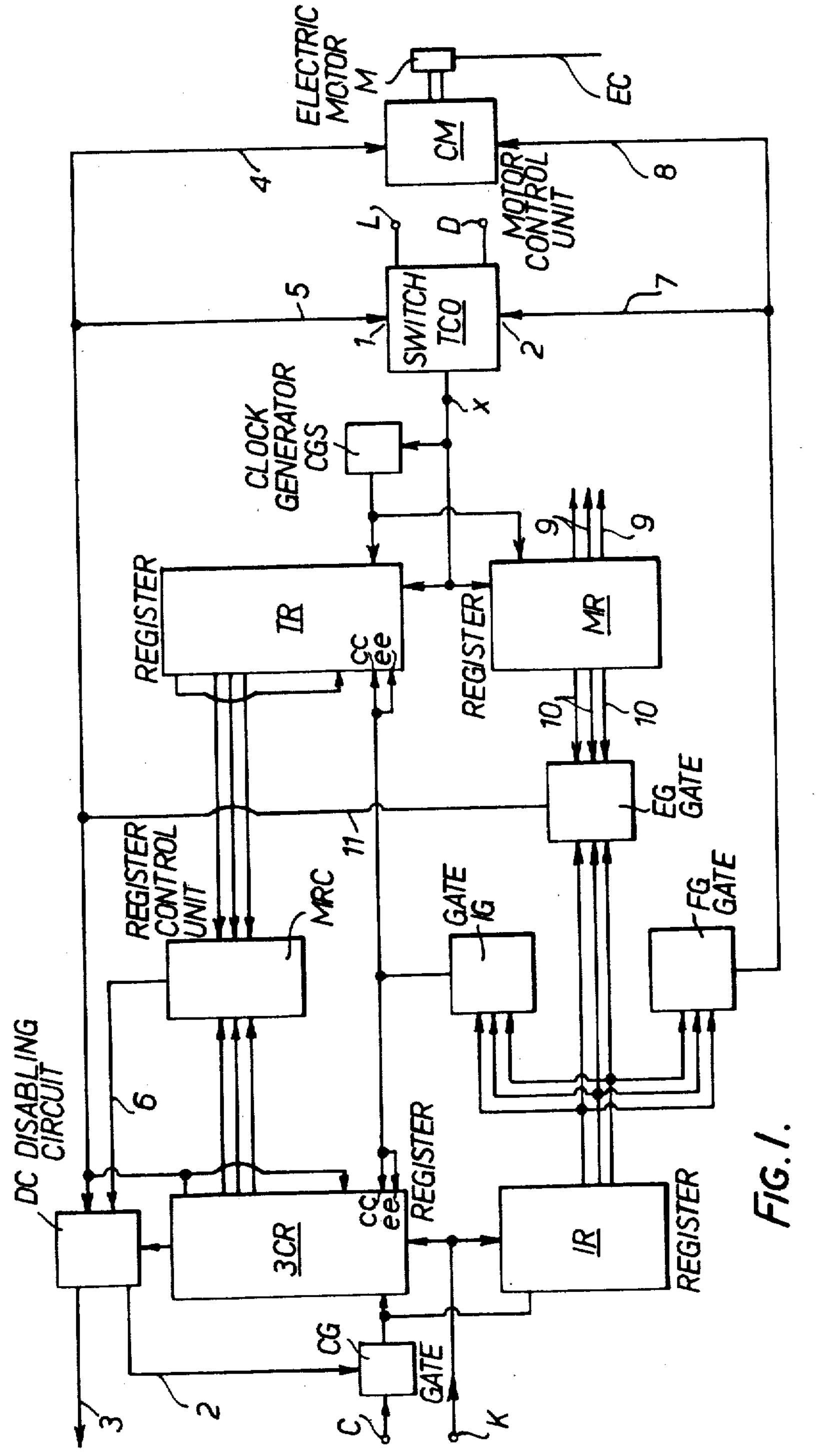
FIG. 1 shows, a block diagram form and only so far as is necessary to an understanding of the invention, a play-off equipment embodying the invention.

The drawing is a block diagram of the main electrical circuitry of an arrangement adapted to find, at high speed, any desired pre-recorded block of data or information, pick it off for utilization and/or display at a lower speed appropriate to such utilization and/or display and then stop ready for the finding and picking off of another desired pre-recorded block of data. The arrangement includes a selector unit (not shown) which may be a manually operable keyboard or a remotely operable unit by the operation of which any desired block of data may be chosen, found, and picked off; and a record unit (also not shown) comprising a pair of pre-recorded magnetic tape or wire records one of which is what is herein termed a label record and the other of which is what is herein termed a data record. There are two pick-up heads (not shown) one associated with each record, that associated with the label record being herein termed the label head and that associated with the data record being herein termed the date head. The records are driven by the same motor which is controllable to be stopped or run at either of two very different speeds, one high and the other low. The high speed is the one used for finding a selected block of data, i.e., is the "search" speed; the low speed is the one used for picking off a selected block of data i.e. is the "play-off" speed. Although both records may be double ended and the motor arranged to be run in either direction when searching for a desired selected block of data it is simpler and preferable to use endless records and arrange the motor always to run in the same direction. The label record is pre-recorded with signals corresponding to a plurality of labels, one for each data block recorded. Each label is composed of digital signals corresponding to what is herein termed an initial character (e.g., the keyboard character "?") followed by digital signals corresponding to what are herein termed identifying characters (e.g., the keyboard letters I N V for a data block corresponding to an invoice) followed by digital signals corresponding to what is herein termed a final character (e.g., the keyboard character "&"). Each block of data on the data record is preceded by three characters identifying it (e.g., INV for the invoice block) and followed by the final character &.

The apparatus shown in the drawing can best be described by describing a series of operations which are carried out in order to find and pick off a data block corresponding with a particular label, for example the label just described and consisting of the characters ? INV &. It will be assumed that the selector unit is a manually operable keyboard the signals from which appear at terminal K. Clock pulses from a source (not shown) are made available at terminal C.

Referring to the drawing M is an electric motor driving the two pre-recorded records and CM is a motor control unit for controlling the motor to run, always in the same direction (endless records are assumed) at search speed or at play-off speed. When the motor is running signals from the label head (not shown) appear at terminal L and signals from the data appear at terminal D.

Assume that initially the motor is stopped but the control unit CM is in that state in which the motor, when set running, will run at search speed and, as already stated, it is desired to find and pick off the invoice block of data identified by the characters INV.

The operator presses in turn the keys ? INV & and then operates an additional key called herein the tape key. Operation of the ? key causes the digital signals representative of this character to appear at terminal K which is connected to the input side of a single character input register IR and to the input side of a three character register 3CR. The latter can for the moment be ignored because the ? character has no effect thereon. The signals appropriate to this character are however entered into the register IR (which has room for one character only) under clock timing provided by the clock pulses fed in at C and which pass through a normally open gate CG. The output side of the register IR is connected to the input sides of two gates one of which IG is termed the initial gate and is pre-wired to recognize and be actuated by the signals appropriate to the initial character ? and the other of which FG is termed the final gate and is pre-wired to recognize and be actuated by the final character &. Because operation of the ? key has set up the signals appropriate to this character in the register IR, gate IG operates and resets the register 3CR, eliminating any signals which may be already stored there, i.e., "clears" this register and, after clearing, sets the said register in a condition to accept further signals, i.e., "enables" this register (to use the customary expression). Operation of the gate IG also clears and enables what is herein termed the tape register TR. In the figure the terminals of the registers 3CR and TR at which signals from the gate IG are applied to effect clearing and enabling are indicated by the references cc and ee respectively.

The next three keyboard characters INV now enter the enabled register 3CR. They also appear at the input of the register IR where, however, they have no effect since this is a single character register and no character in the label (INV) will be recognized by any pre-wired gate connected to IR. When the register 3CR is full it supplies a signal over lead 1 to a disabling circuit DC to cause the same to apply over lead 2 a potential which closes the previously open gate CG; and also to cause said circuit DC to feed over lead 3 a potential which prevents the supply of further signals to the input terminal K; and also to cause said circuit DC to feed over lead 4 a signal which sets the motor control unit CM into the position appropriate for high search speed running of the motor and over lead 5 a signal which operates a two-position track change-over switch device TCO to cause it to adopt its "search" position. In this position the switch device TCO will feed through to its output side (its left hand side in the figure) signals which are from the label head and appear at terminal L. In its other position, the play-off position the switch device will feed through to its output side signals which are from the data head and appear at terminal D. When the foregoing operations have been performed and the switch device TCO is accordingly in its search position the tape key is depressed. This completes an energizing circuit represented merely by the lead EC for the motor, which accordingly starts to run at the high, search speed.

Signals from the label head now appear at L and are fed through device TCO to the tape register TR which has a capacity of three characters. Clock timing input for this register is provided by a clock generator source CGS of known form adapted to develop clock pulses from digit signals which are also pre-recorded on the two tapes and thus occur, at a frequency proportional to tape speed, in the outputs from the label head and data head. While the motor is running at high speed the clock pulse output from CGS will be at a frequency controlled by the digit signals in the label head output fed in at L and therefore will be in correspondence with the speed of the motor M, now running at search speed.

It will be remembered that the data block identifying characters INV are stored in the register 3CR. When that part of the label tape on which the data block identifying characters INV are recorded passes under the label head, the content of the register TR will match that of the register 3CR. These two registers jointly control, in known manner, a matched register control unit MRC which operates when the two inputs thereto, one from 3CR and the other from TR are alike, i.e., match. When operated the unit MRC feeds over lead 6 to the disabling circuit DC a potential which causes the same (via lead 2) to re-open gate CG; feed (over lead 3) a potential which removes the previously applied disabling control presenting the supply of signals to the terminal K; and remove the previously applied potentials fed over leads 4 and 5 to the motor control unit CM and the switch device TCO. This removal of the potential on lead 4 would cause the motor to stop but, as will shortly be seen, this said removal is only momentary and therefore the motor continues running by reason of its inertia.

Opening of the gate CG allows signals corresponding to the final character & to enter the register IR. This character is recognized by the gate FG actuating the same to cause it to supply over lead 7 a potential which changes over the switch device TCO to its second or play-off position and to supply over lead 8 a potential which causes the motor control unit CM to change over the motor speed to slow or play-off speed.

The two record tapes are now running at slow speed and signals from the data head now pass through the switch device TCO. These signals will be those of the block of data identified by the characters INV because, of course, the label and data tapes always run together and the beginning of any block of data on the data tape passes under the data head a suitably short time after the characters on the label tape identifying that block (characters INV in the case now being considered) pass under the label head.

Signals from the INV data block on the record now enter a message register MR which also receives necessary clock pulses, at the new lower frequency, from the generator source CGS. Register MR is a single character register. The same signals are also applied to the tape register T where, however, they are of no effect because the register L has not yet been re-enabled. The output from the register MR is fed over leads 9 for utilization and/or display by known means (not shown).

When the information portion of the data block has thus been played off the end-of-message character (e.g., the keyboard character &) which is pre-recorded on the data tape after the end of each block of information signals, is picked-up and is fed via leads 10 to gate EG which has been pre-wired to recognize this character. On recognition of this character gate EG feeds over leads 11 and 4 a signal which causes the motor to stop; and feeds over leads 11 and 5 a signal which changes back the position of the change over switch device TCO. The whole apparatus is now stopped and in its original condition ready for the selection, finding and picking or playing off of any other desired data block.

For convenience the description of the drawing as so far given has assumed two separate record tapes run together by the same motor, one the label tape and the other the data tape. This of course is not necessary or even very desirable in practice it being generally better to have a single tape with two record tracks, one a label track and the other a data track, side by side on it. It is, indeed, not necessary to have two tapes or two tracks at all for label information and data information can be recorded on a single track, each block of data being preceded by the appropriate label (e.g., ? INV &) and followed by an end of message character. The equipment shown in the drawing requires but little modification to adapt it for use with such single track recording, the modification consisting essentially in dispensing with the switch device TCO, connecting the single pick-off head direct to the point X in the drawing and, preferably, inserting in the path from X to the register TR, a high pass filter which will exclude from that register lower frequency signals which are picked off by the head when co-operating with a data block part of the record and inserting in the path from X to the register M the higher frequency signals which are picked off by the head when co-operating with a label part of the record. Owing to the wide difference between the search speed and the play off speed quite simple filtering is all that is necessary effectively to separate the head signals obtained in operation at the two speeds.

The drawing has so far been described as showing a play off equipment for use with previously recorded tracks. In some cases, however, the equipment may be required to provide the facility of recording, or changing parts of existing recording, using the same keyboard or other unit (herein before referred to as the selector unit) for effecting such recording. This will obviously involve the provision of a recording head or, if there are two tracks (a label track and a data track), two recording heads, one associated with each track. The keyboard would have, in addition to those already mentioned in connection with the accompanying figure additional function character keys including a "start of message" key for operation when recording is to be effected and a "delete" key for use when it is desired to search for, find, and erase some particular already recorded label and the data block appropriate thereto. The recording system would also include an automatic alarm arrangement for guarding against the accidental over-running, when recording new material, of an already recorded label and the data appropriate thereto unless it was desired to delete the old label and material.

Figure 2:
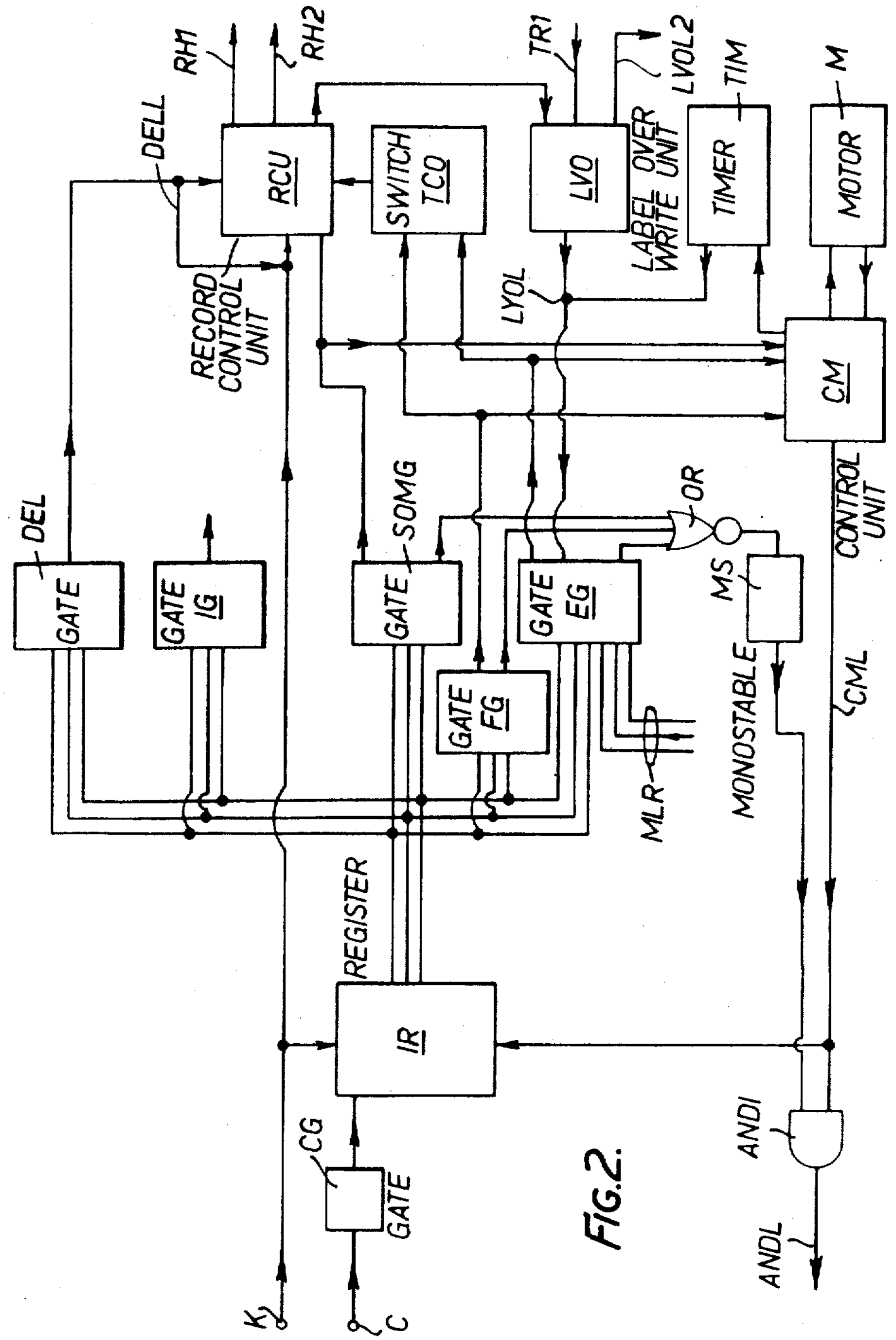
FIG. 2 is a figure of the same general nature as FIG. 1, showing equipment which, if added to an apparatus as illustrated by FIG. 1, would provide recording facility as well.

FIG. 2 illustrates so far as is necessary to an understanding of the invention an equipment providing facilities for recording and for playing off. In order to simplify the figure and not necessarily repeat description already given in connection with FIG. 1, only those selected parts of FIG. 1 which are necessary to an understanding of the recording part of the equipment are shown in FIG. 2. These parts are indicated by the same reference as in FIG. 1 and, so far as their functions in playing off are concerned, are connected and operate as already described in FIG. 1.

Referring to FIG. 2, assume that the motor is stopped but the control unit CM is in that state in which the motor when set running will run at search speed, i.e., high speed. The operator desiring to record a block of data presses in turn the keys SOM, INV, &, the succession of keys appropriate to the block of data, and finally the EOM key. (As before it is assumed that the block of data relates to an invoice, hence the "keying" of INV). Finally he presses the tape key.

Pressing the SOM key causes digital signals representative of this SOM character to appear at terminal K which is connected to the input of IR and also to one input of a record control unit RCU which, dependent on its condition, can apply digital signals appearing at K to be fed to either of two recording heads (not shown) one positioned on one track and connected to lead RH1 and the other positioned on the other and connected to lead RH2. Assume that, at the moment neither lead RH1 or RH2 is connected through RCU to terminal K.

The digital signals corresponding to SOM are recorded in register IR and are "recognized" by and actuate an SOM gate SOMG. Upon actuation gate SOMG connects lead RH1 to terminal K; operates unit CM to start motor M running; and applies to lead CML a voltage from a source (not shown) which is included in CM. When the motor reaches search speed a tachometer switch (not shown) actuated thereby, removes this voltage from CML. When this voltage is present on lead CML it disables the register IR preventing it from storing any further digital signals and also via an AND gate AND1 (the second input to which will be described later) applies on lead ANDL an inhibiting voltage which prevents, while present, the transmission of any digital signals from the keyboard. When the motor reaches speed the disabling voltage to IR and the inhibiting voltage on ANDL are removed.

The "label" characters INV are now sent and the corresponding signals are recorded on track 1. When the signals corresponding to & arrive, the gate FG operates. It actuates the unit CM to switch the motor over to slow speed and at the same time causes the disabling and inhibiting voltages already mentioned to appear one more at IR and on lead ANDL. Tachometer switch means controlled by the motor remove these voltages when the required slow speed is reached. Operation of gate FG also actuates TCO which switches over the record control unit RCU to connect terminal K to lead RH2. It also causes, via an OR gate OR, a monostable MS to send via gate AND1 a short pulse temporary disabling pulse over lead ANDL. If desired a similar short inhibiting pulse may be fed to IR.

The motor is now running at the required slow speed and when the signals appropriate to the characters in the block of data arrive they are fed via lead RH2 and recorded on track 2.

The next signals to arrive are those of the EOM character. These are fed in to the register IR, and actuate gate EG. This actuation switches back TCO and operates the motor control CM to stop the motor. It also causes via the OR gate OR the monostable MS to apply a temporary inhibiting pulse to ANDL and also, if desired, a temporary disabling pulse to IR.

Preferably the tachometer switch means already mentioned are constituted by a switch device which is closed to provide inhibiting and/or disabling voltage whenever the motor speed is materially different from that demanded by the setting of the unit CM. In this inhibition or disablement is obtained whenever the motor is changing speed i.e. from rest to search speed; from search speed to slow speed; or from slow speed to rest.

FIG. 2 shows some additional protective devices which are also preferably provided. They include a timer TIM which, when actuated, runs for the time taken for the whole closed loop of record tape to pass the recording or pick-up heads when the motor is running at high speed. A signal generated (by means not shown) in the unit CM whenever the motor is started from rest is fed over lead TSL to start the timer running. If by the time the timer reaches the end of its time run the gate EG has not caused the motor to stop, the signal which the timer always produces at the end of its run causes the gate EG to operate and stop the motor.

The second protecting function is performed by a label over-write unit LVO. This is in essence a detector detecting signals picked up by the pick-up head in track 1 and fed in over the lead marked TR1 in FIG. 2. Recording, when effected, should of course be effected on a blank piece of tape and if one recording operation "over-runs" into a length of recording already on track 2, the earlier recordings will be lost where one over-runs the other. Before, however, this can happen the label signals INV on track 1 will be picked up. These are detected at LVO and, if this happens, LVO sends a signal over lead LVOL to actuate gate EG and, if desired, may also actuate an alarm (e.g., light a lamp) (not shown) actuated by a signal on lead LVOL2. It will be observed that there is a connection between the units RCU and LVO. This represents a control for ensuring that LVO is not in operation except when a recording operation is in progress. The leads marked MRL represent leads connecting the register MR (of FIG. 1) to supply signals to gate EG.

Effective deletion of any block of data recorded on track 2 can be achieved (without actually deleting it) by deleting its "label" on track 1. This can be done by means of the deletion gate DEL. The keyboard has an additional character key DEL — the character for deletion. To delete the sequence transmitted (assuming again an invoice INV) is ? INV DEL EOM. Until the transmission of the end of INV the operation is exactly the same as already described in connection with FIG. 1. If now DEL is transmitted, the DEL gate is actuated, and switches the recorder on to track 1 (although, in fact, if nothing has gone wrong the recorder will already be on track 1) and at the same time applies an inhibiting voltage to lead DELL. This is, of course, an erasing operation and the previously recorded selected label is erased. After this the arrival of the EOM signals produce operation as already described. It may be pointed out here that the pick-off heads are ahead of the recording heads, i.e., the tape passes them first.

The foregoing description has been written, for the sake of simplicity, as though the keys sent their signals to the apparatus shown in the figures as and when they were operated. In practice of course, this is not so but the keys function in customary manner, that is to say, when one or a succession of keys is or are operated, their signals go into a store forming part of the keyboard equipment and it is from this store that the signals sent to the apparatus illustrated are taken as a sequence at a fixed pre-determined rate: — in fact, when the key marked "tape" is actuated (assuming there are no inhibiting voltages present at the time). References in this specification to signals from keys should therefore always be read as references to signals taken, as in the usual way, from a keyboard store in which they have been stored by preceding operation of keys.

I claim:

1. A data store equipment adapted to search at relatively high speed for any of a plurality of items of information recorded on a record body and to play off the same at relatively low speed when found said equipment comprising recorded signal pick-up means for picking up signals recorded on said body; motor means for driving said record body relatively to said pick-up means; control means for controlling said motor means and having high speed, low speed and stop setting; means (for operation when it is desired to search for a particular item) for initially setting said control means to its high speed setting; means responsive to any of a plurality of selectable label signal sequences each of which is individual to and identifies a different item and each of which has been recorded on said body in a position a little in advance of the beginning of the item it identifies, for automatically changing over said control means to its slow speed setting; and means responsive to a pre-determined terminating signal sequence which has been recorded on said body in positions each of which is a little behind the end of a different item, for changing over said control means to its stop position.

2. An equipment as claimed in claim 1 wherein the record body is a magnetically recorded tape and the pick-up means are magnetic recorded signal pick-up means.

3. An equipment as claimed in claim 1 wherein the label signal sequences, signals representative of items of information and the terminating signal sequences are recorded on the same track with which is associated a single pick-up head.

4. An equipment as claimed in claim 1 wherein there are two tracks side by side on the same record body, one recorded with signals representative of items of information and the other recorded with the label signal sequences and the terminating signal sequences, there being two pick-up heads, one associated with each track.

5. An equipment as claimed in claim 1 wherein the record body is an ended one and means are provided for reversing the direction of run of the motor means when either of the two ends is approached.

6. An equipment as claimed in claim 1 wherein the record body is a continuous loop without ends and the motor means is arranged to run always in the same direction.

7. An equipment as claimed in claim 1 wherein the recorded signals, whether item information signals or label or terminating signal sequences, are digital signals.

8. An equipment as claimed in claim 1 and including for searching for and playing off desired recording items, a first one-character register to which clock timing pulses are applied through a normally open gate; means for entering in said register input signals corresponding to a pre-determined initial character; and initial gate connected to the output of said register and pre-wired to recognize the initial character; a final gate also connected to the output of said register and pre-wired to recognize a different final character; a first multiple character register; means actuated upon response of said first one-character register when recognizing said initial character for clearing any signals stored in said multiple character register and preparing the same to receive further signals; a tape register which is also a multiple character register of the same number of characters as the first; means also actuated upon response of said first one-character register when recognizing said initial character for clearing any signals in the tape register and preparing the same to receive further signals; means for entering into the prepared first multiple character register signals corresponding to a desired multi character label; means actuated by said multiple character register when filled for causing the aforesaid normally open gate to close temporarily inhibiting the supply of further input signals setting the motor control means to its high searching speed position and setting a switch device into a position in which it connects the output of a recorded label pick-up head to the input of said tape register; means responsive to another pre-determined signal for setting the motor running at the high searching speed to which the motor control unit has been set; means for applying to said tape register pulses derived from digit pulses recorded on the record body and occurring at a frequency proportional to the speed thereof; means actuated automatically when the label already stored in said first multiple character is matched by a label fed to said tape register from said pick-up head for re-opening the aforesaid normally closed gate and removing the aforesaid temporary inhibition to permit the aforesaid final character to enter the first one- character register; means actuated upon recognition of said final character by said final gate for causing the motor to run at the low speed already set up by the motor control and changing over said switch device to a position in which it connects the output of a data pick-up head to a message register to which clock pulses at a lower frequency corresponding with the low motor speed are supplied; and means actuated by the appearance in the output from the data pick-up head of a pre-determined recorded terminating signal sequence for stopping the motor and restoring the equipment to its original condition.

9. An equipment as claimed in claim 8 and having additional apparatus for providing the facility of recording said additional apparatus including recording means entering a further predetermined character into the previously mentioned first one-character register; a record gate also connected to the output of said first one-character register and adapted to recognize said further character; means actuated upon recognition of said further character by the record gate for starting the motor running; means dependent upon motor speed for disabling said first one-character register and temporarily preventing the supply of input signals until the motor reaches its high search speed; means, enabled when said search speed is reached, for utilizing the recording means to record a multi-character label; means actuated by the above-mentioned final gate upon recognition thereby of the final character to change over the motor control to cause the motor to run at the low speed required for recording or playing off; means for supplying data signals to the recording means for recording the same while the motor is running at low speed; and means responsive to the above-mentioned predetermined terminating signal-sequence for stopping the motor.

10. An equipment as claimed in claim 1 wherein means are provided for effecting inhibiting the supply of signals to the equipment whenever the motor speed differs materially from that pre-determined speed which corresponds with the setting of the motor control at the time.

11. An equipment as claimed in claim 1 wherein the record is endless and there is provided a timer, which, when started, runs for substantially the time taken by the motor, running at high or search speed, to cause traversal of the whole record length; means, actuated whenever the motor is started from rest, for starting the timer; and means actuated by the timer at the end of its time, for stopping the motor and setting the equipment into its rest condition if this has not already been done.

12. An equipment as claimed in claim 1 and including means, operable upon the picking up of an already recorded label when the equipment is being used for recording, are provided for disabling the equipment as regards recording and/or giving an alarm indication whereby accidental overrunning of an already recorded item by a new item being recorded is prevented.

13. An equipment as claimed in claim 1 wherein means are provided for effectively deleting any recorded item which is no longer required on the record by searching for said label at search speed and deleting said label.

* * * * *